US005683176A

United States Patent [19]

Clendenin

[11] Patent Number: 5,683,176

[45] Date of Patent: Nov. 4, 1997

[54] RETRACTABLE LIGHTING ASSEMBLY

[76] Inventor: Patrick B. Clendenin, P.O. Box 3216, Thomasville, Ga. 31799

[21] Appl. No.: 418,387

[22] Filed: Apr. 7, 1995

[51] Int. Cl.[6] ........ B60Q 1/06

[52] U.S. Cl. ........ 362/385; 362/285

[58] Field of Search ........ 362/385, 285

[56] References Cited

U.S. PATENT DOCUMENTS

| | | | |
|---|---|---|---|
| 2,738,492 | 3/1956 | Arneson et al. | 362/74 |
| 4,180,850 | 12/1979 | Bivens | 362/285 |
| 4,974,134 | 11/1990 | Bourne | 362/286 |
| 5,003,441 | 3/1991 | Crowe et al. | 362/285 |
| 5,068,773 | 11/1991 | Toth | 362/386 |
| 5,072,345 | 12/1991 | Goggia | 362/153.1 |
| 5,142,463 | 8/1992 | Panagotacos et al. | 362/285 |

*Primary Examiner*—Ira S. Lazapos
*Assistant Examiner*—Alfred Basichas
*Attorney, Agent, or Firm*—Carnes, Cona & Dixon

[57] ABSTRACT

The present invention provides for a pneumatically operated retractable lighting assembly that is adapted for insertion into the ground, existing ceilings, or the like. The pneumatically operated retractable lighting assembly includes a first housing that receives a second housing. The second housing is in a slidable relationship to the first housing. The second housing further supports the light fixture. When the device is activated, air is supplied to the first housing in order to lift and activate the second housing and current is supplied to the light fixture. During deactivation, the air escapes the first housing to permit the second housing to retract into the first housing while current is no longer supplied to the light fixture.

20 Claims, 12 Drawing Sheets

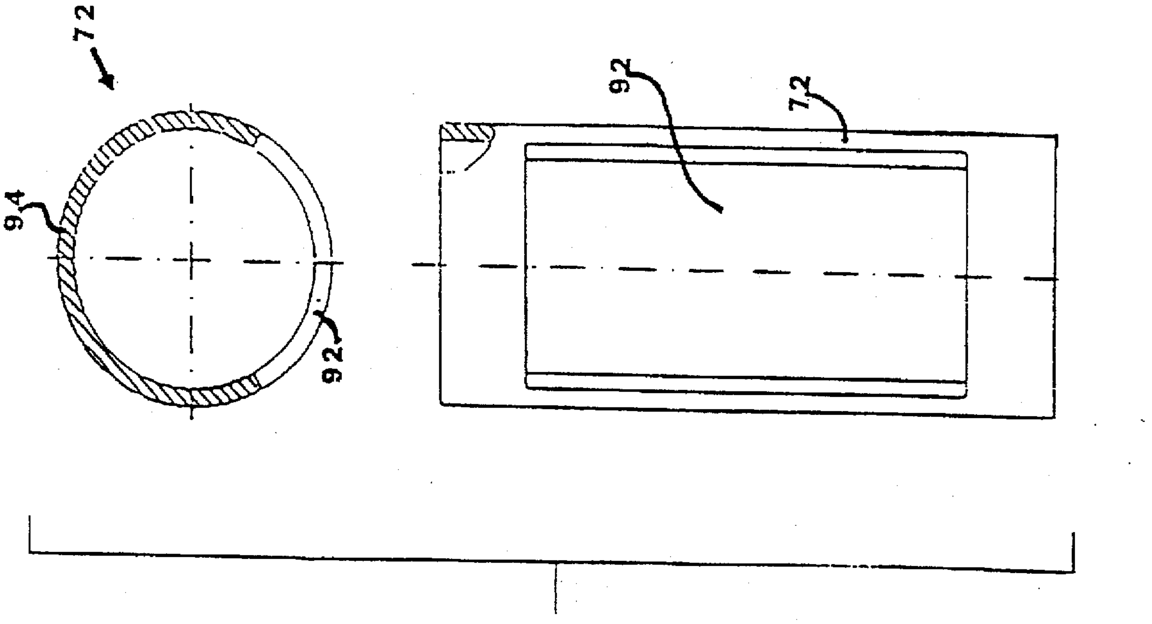
FIG. 10b
FIG. 10a
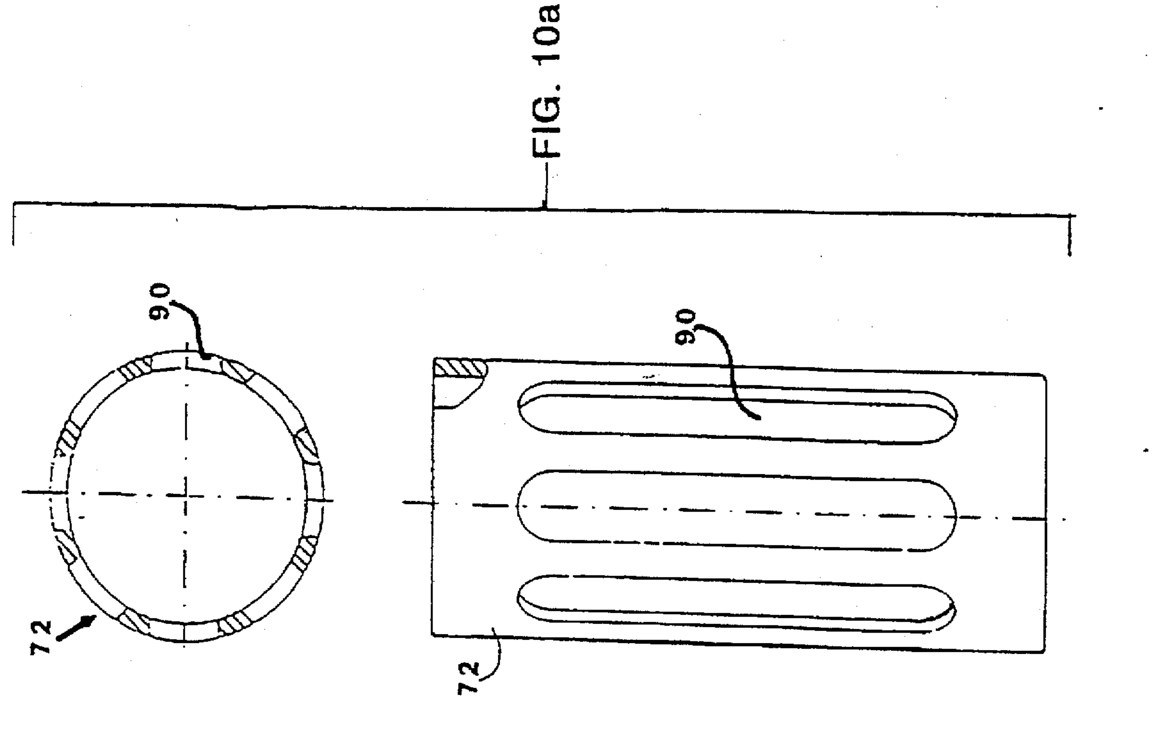

RETRACTABLE LIGHTING ASSEMBLY

BACKGROUND OF THE INVENTION

1. Field of the Invention

The present invention relates generally to a retractable lighting assembly and more particularly to a retractable lighting assembly which can be recessed in the ground and pneumatically operated in order to be pop up therefrom when illumination is desired.

2. Description of the Prior Art

Landscape lighting has been used through the U.S. for exteriorly illuminating a specific area. The lighting assembly, such as landscaping lighting fixtures are typically situated in the ground in order to provide for the lighting fixture to protrude upwardly from the ground. These particular lighting fixtures are visually obtrusive during the daylight and are also hazardous since an individual can easily trip over the protruding lighting fixture when working in the vicinity of the feature. Further, landscaping maintenance, such as mowing, is a difficult and time consuming process since the lighting fixtures are not flush with the ground and the individual must operate machinery around the protruding fixtures.

Because of the difficulties that are associated with standard protruding landscaped lighting fixtures, efforts have been made to provide for a lighting fixture that retracts underground when the device is not in use. One light fixture is disclosed in U.S. Pat. Nos. 5,072,345, and 4,984,139 both issued to Goggia and U.S. Pat. No. 4,974,134 issued to Bourne. These patents disclose a retractable lighting fixture that when not in use is stored underground, in order to provide for the light fixture to be flush with the ground. Goggia and Bourne each disclose a light fixture that consists of a first housing which includes a light source. The light source further includes a second housing that maintains the first housing when the light fixture is not activated. Once the lighting fixture is activate, the first housing is lifted, via the shaft of a reverse drive motor, to provide for the light fixture to protrude above ground. The light fixtures disclosed in Goggia's patents and Bourne's patent are energy inefficient, complex and require several components. This increase in components causes an increase in the possibility of component failure.

U.S. Pat. No. 4,180,850 issued to Bivens discloses another light fixture that consists of a first housing, which includes a light source, and a second housing that stores the first housing when the light fixture is not utilized. Upon activation of Bivens' light fixture, the first housing is lifted via a hydraulic line. The light fixture disclosed in Bivens in extremely expensive to fabricate due to the high cost of hydraulic fluid as well as being potentially hazardous to the environment if the hydraulic line were to leak.

None of these previous efforts, however, provide the benefits intended with the present invention, such as providing a lighting assembly that is energy efficient and virtually trouble free in operation. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides for a lighting assembly that is adapted to be located underground or in ceilings.

Once activated, this lighting assembly will extend upward or outward to illuminate the vicinity and area of the lighting assembly. By locating the lighting assembly in the ceiling of walkways, shopping centers, and the like, will not only increase safety, but will prevent or minimize vandalism of the lighting assembly and the surrounding areas that are being illuminated. The ground and ceiling are considered as bases for the lighting assembly of the present invention.

The lighting assembly of the present invention comprising a first housing and a second housing. The first housing is a hollow and water proof structure that includes an opened upper end and an enclosed lower end. The opened upper end is disposed in a co-planar relation to the ground surface or ceiling surface when the lighting assembly is installed in the ground or ceiling, respectfully. The second housing is a water proof structure that is received in the opened upper end of the first housing. This arrangement will permit for the second housing to be slidably mounted to the first housing. The top of the second housing is substantially flat and lies flush with the ground or ceiling when the device is not activated.

The second or inner housing includes an enclosed top. A light source is attached to the upper surface of the enclosed top of the second or inner housing. A receptacle houses the light source. Once the system is activated, the receptacle protrudes beyond the ground or extends downwardly from the ceiling to permit for the light source to illuminate the desired area.

The enclosed end of the first or exterior housing includes at least one aperture. A wiring line extends from the light source and through the aperture. This wiring line is connected to an activation source. The aperture receives a conduit that is connected to the activation source.

Alternatively, this enclosed end may include a first aperture and a second aperture to provide for an aperture to separately receive the wiring line and the conduit.

The activation source that is utilized includes a power switch, a power source, air compressor. This power switch activates the power source and the air compressor. This will provide for the light source to activate or turn on the light source via the wire line. The conduit is connected to the air compressor. The air will enter into the first or exterior housing. This air will force the second housing outwardly in order to permit for the light source to protrude beyond the ground. When the switch is deactivated air escape from the exterior or first housing and thereby provides for the light source to be lowered and the second housing to be stored within the first housing.

Accordingly, it is the object of the present invention to provide for an energy efficient retractable lighting assembly.

It is yet another object of the present invention to provide for an environmentally safe retractable lighting assembly.

Still another object of the present invention is to provide a retractable lighting assembly which employs minimum parts for inherently easing the operation and caring of the lighting assembly by proving the elements of the lighting assembly to be assembled and re-assembled easily for cleaning and repair.

A final object of the present invention, to be specifically enumerated herein, is to provide a retractable lighting assembly in accordance with the preceding objects and which will conform to conventional forms of manufacture, be of simple construction and easy to use so as to provide a device that would be economically feasible, long lasting and relatively trouble free in operation.

Although there have been many inventions related to retractable lighting assemblies none of the inventions have become sufficiently compact, low cost and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 10*a* is a side view of a first embodiment of the decorative insert used in the lighting assembly of the present invention.

FIG. 10*b* is a side view of a second embodiment of the decorative insert used in the lighting assembly of the present invention.

Similar reference numerals refer to similar parts throughout the several views of the drawings.

DESCRIPTION OF THE PREFERRED EMBODIMENTS

Figure 1:
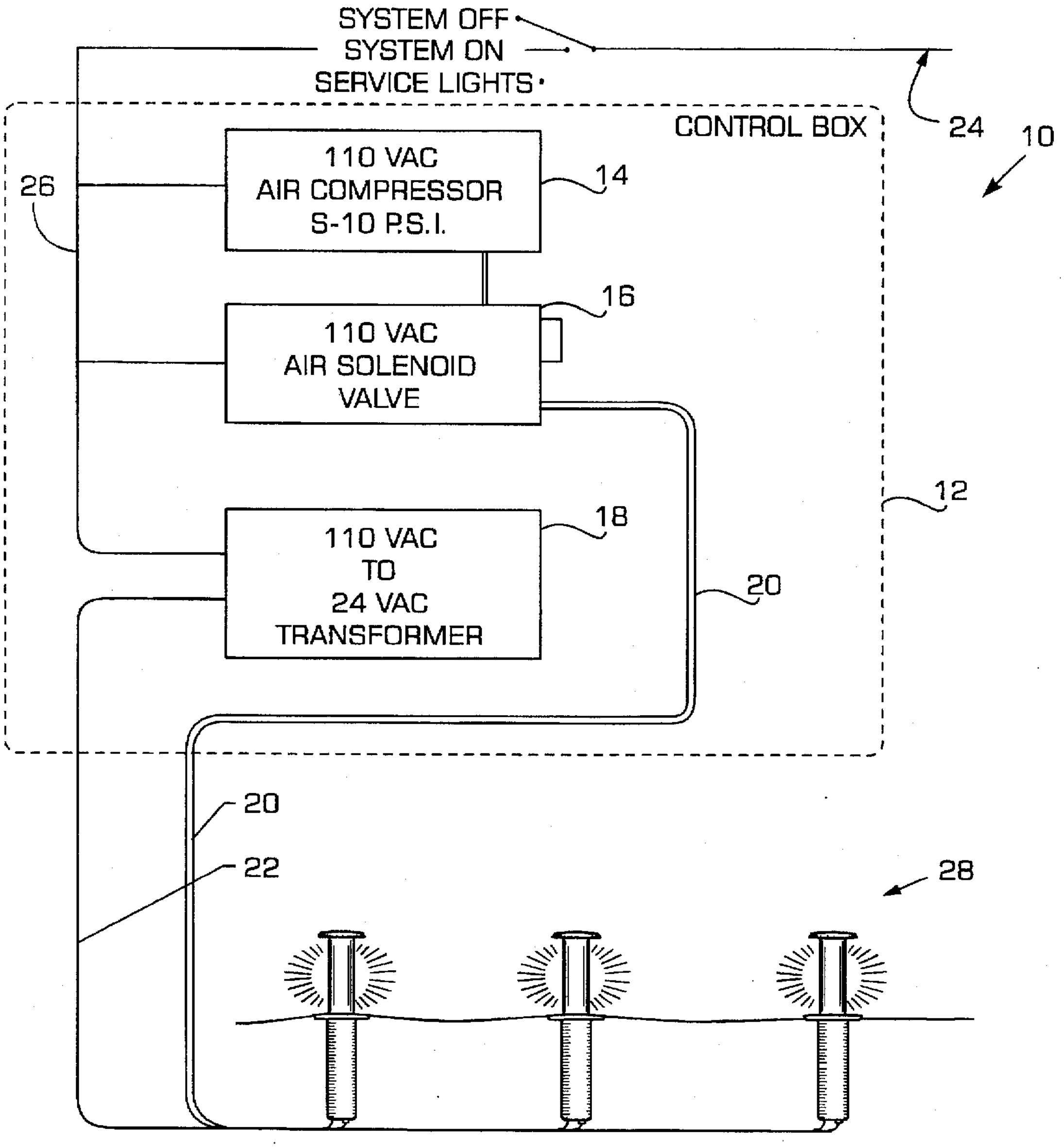
FIG. 1 is a partial block view of the lighting assembly of the present invention utilizing the first embodiment of the activation means.

FIG. 1 illustrates the retractable lighting assembly of the present invention. As seen in this figure, the retractable lighting assembly 10 includes a plurality of lighting modules 28. These lighting modules 28 are illustrated in an opened or extended position. Each lighting module 28 is in mechanical and electrical communication with an activation means via a conduit 20 and a wiring line 22. This activation means consists of a switch 24 and a control means 12. This switch 24 is coupled to the control means via a second wiring line 26. This switch 24 is also coupled to a power supply (not illustrated). The switch 24 activates or deactivates the light modules. For activation of the retractable lighting system 10, the switch 24 would be turned or positioned on the "system on position". This will provide for the control means 12 to render the lighting module 28 to be in an opened or extended position (as illustrated in this figure). For deactivation or retracting the light modules 28, the switch 24 would be turned or position on the "system off". This will provide for the lighting modules 28 to be flush with a ground or ceiling. For activating the module 28 without supplying electricity to the system, the switch 24 is turned or position to "service lights". This will provide for the lighting module 28 to be in an opened or extended position while not permitting power or current to travel to the system via wiring line 22.

It is noted that the activation means or the power supply can be any conventional source, such as batteries, solar cells, or the existing power in a residential or commercial dwelling.

The lighting modules are pneumatically lifted. This design and configuration will permit for air to travel via conduit 20 to the lighting module 28. This air will push the light source within the light module 28 upwards.

In order to provide for air to be supplied through the conduit, the control means includes an air compressor 14. This air compressor is coupled to a solenoid valve 16. The control means 12 may also include a transformer 18 for providing the system 10 to be supplied with the appropriate and correct voltage.

As seen in this figure, upon activation, the air compressor 14 permits for air to enter into the lighting module so as to permit for the device to be lifted. Upon deactivation, the solenoid valve 16 enables the air to escape.

Figure 2:
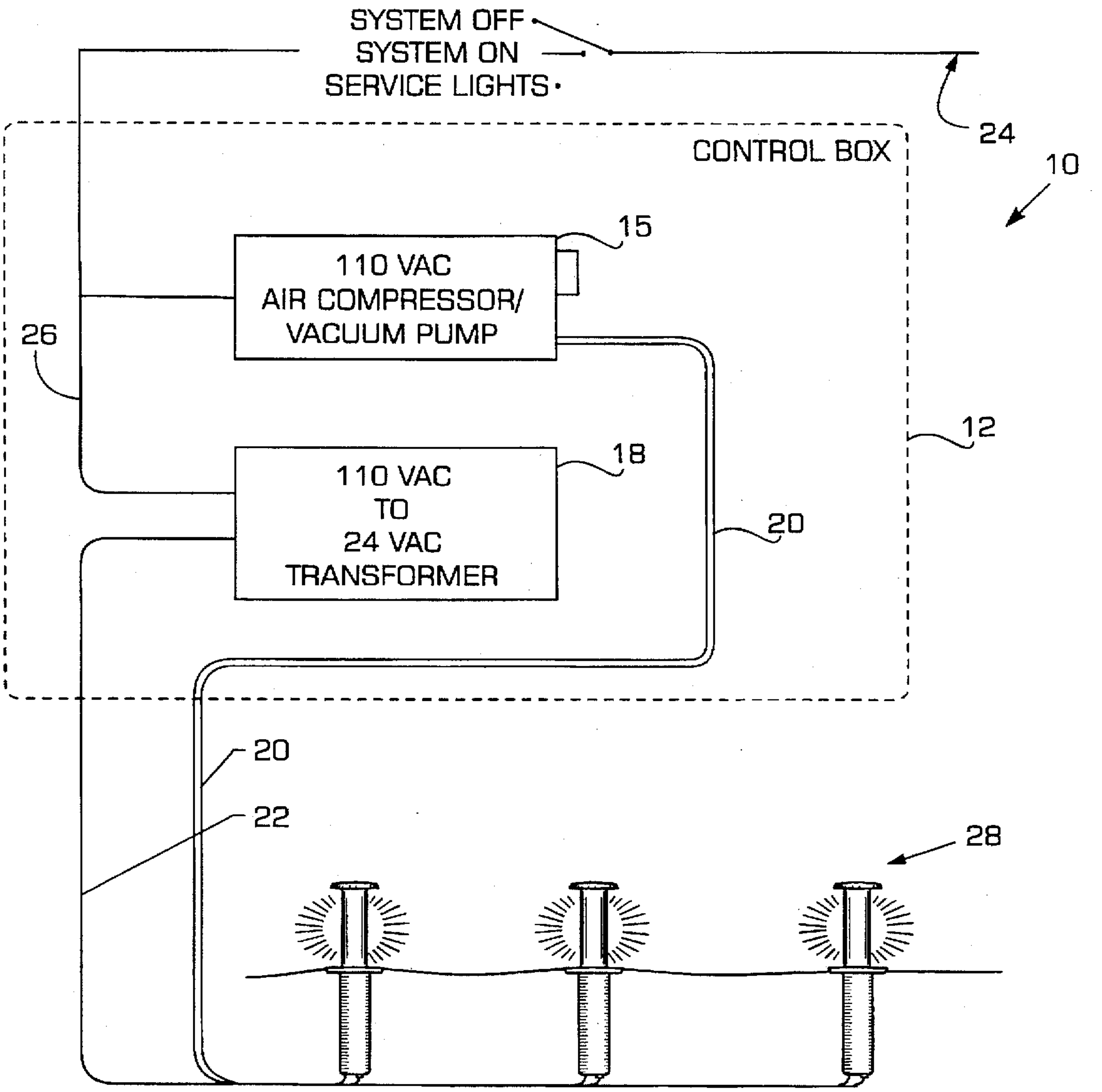
FIG. 2 is a partial block view of the lighting assembly of the present invention utilizing the second embodiment of the activation means.

This control means 12 can be altered or simplified to provide for a second embodiment for the control means. This second embodiment for the controls means is illustrated in FIG. 2. As seen in this figure, the retractable lighting assembly 10 includes a lighting module 28 that is coupled to a control means 12 via a first wiring line 22 and a conduit 22. A switch 24 is coupled to the control means 12 via a second wiring line 26. This switch provide for the activation or deactivation of the system.

The control means 10, in this second embodiment includes a combination air compressor and vacuum pump 15. This will provide for the air to be supply to the lighting modules via the air compressor and conduit 20. Air will be release from the lighting modules 28 via the vacuum redrawing the air therefrom via conduit 20. The control means 12 may also include a transformer 18 for providing the system 10 to be supplied with the appropriate and correct voltage.

This lighting module 28 includes various elements. A first embodiment of the lighting module is illustrate in further detail in FIGS. 3,4 7*a*, 7*b*, 8*a*, and 9*a*. As seen in these figures, the first embodiment of the lighting module includes a first or exterior housing 30. The first or exterior housing 30 is buried within the ground 80. The first housing includes an enclosed bottom 32 and an opened top. The periphery of the open top includes a flange 34. When installed, the flange 34 of the exterior housing 30 is flush with the ground 80.

The bottom 32 includes a first aperture 36 and a second aperture 38. This first aperture receives the first wiring line 22. A seal 40 is located within this first aperture. This seal will provide an adequate sealing means for the first aperture. The second aperture 38 receives the conduit 20. The second aperture receives the conduit (not labeled in this figure). This conduit includes an inlet connector 46. The inlet connector 46 will permit for the conduit 22 to be connected to the lighting assembly 28.

It is noted that the second opening is provided with ridges 44. These ridges act as a blocking means and will prevent any material that may get into the interior of the first container from escaping into the air conduit.

The lighting assembly further includes a second or interior housing 48. The second or interior housing 48 includes an opened bottom and an enclosed top 50. Surrounding the periphery of the opened bottom is a flange 52. This flange 52 includes a groove 88 (see FIG. 9*a*) that is adapted to receive a seal or O-ring 54. When assembled, the edge of the flange 52 and the O-ring 54 are in communication with the interior side wall of the exterior housing 30. This will provide for a gap to exists between the inner wall of the first housing and the outer wall of the second housing. The opened bottom of the second housing 48 is received in the opened top of the first housing 30. This will provide for the second housing 48 to be in a slidable relationship within the first housing 30. This will provide for a pair of telescoping tubular housing members 30 and 48. To provide for a completely sealed system, a seal or O-ring 58 is located on the periphery of the opened first housing 30.

A third opening 61 (labeled in FIG. 5) which includes a seal 60 extends centrally through the enclosed top 50 of the second housing. A base 62 of a light source 64 is secured to this upper surface of the enclosed top 50 of the second housing 48. The wiring line 22 extends from the first aperture 36 through the third aperture to enable the wiring to extend though the first and second housing and be in electrical communication with the light source 64.

Figure 3:
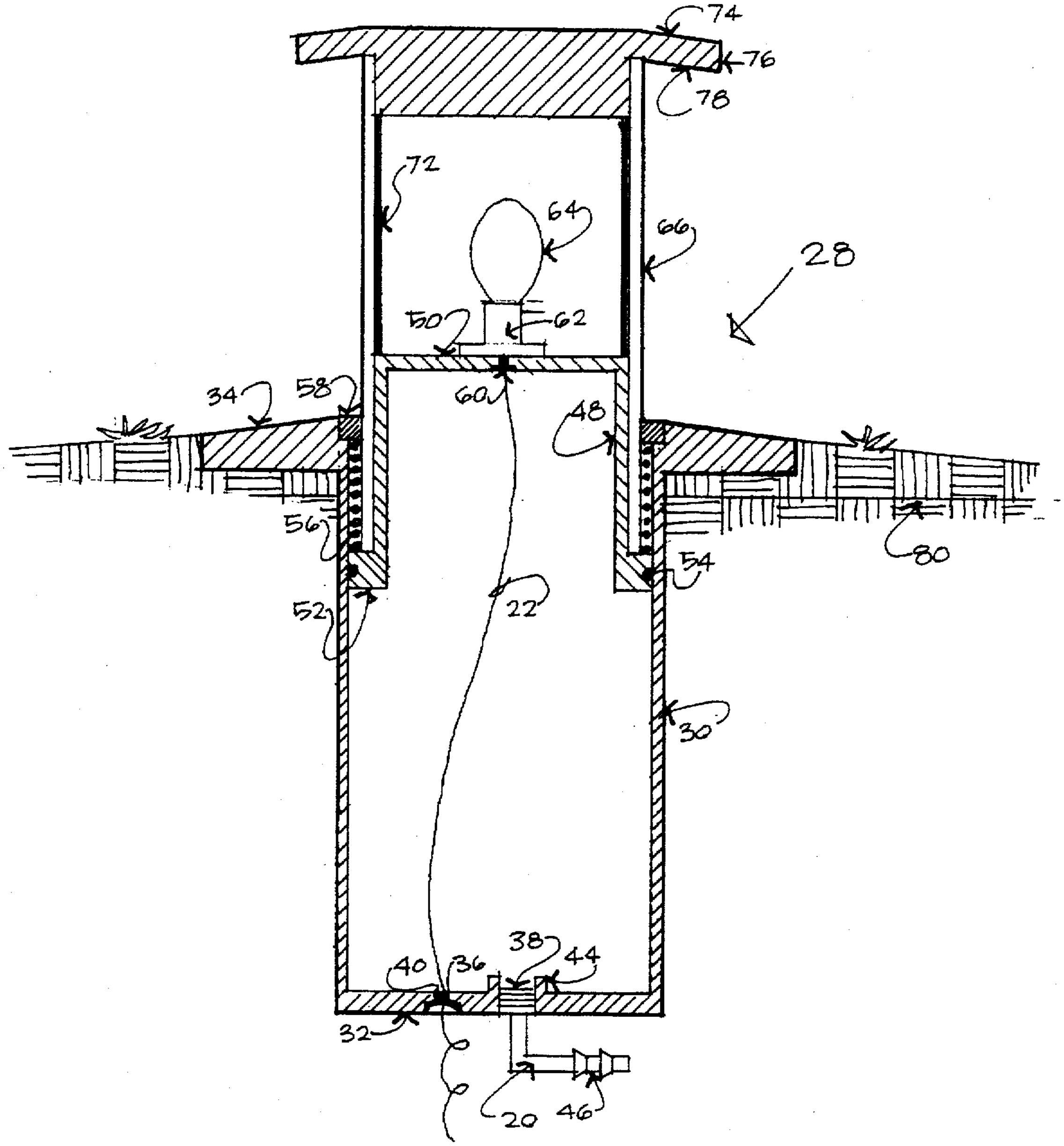
FIG. 3 is a cross-sectional view of the first embodiment of the lighting module used in the lighting assembly of the present invention in an extended and protruding position.
Figure 4:
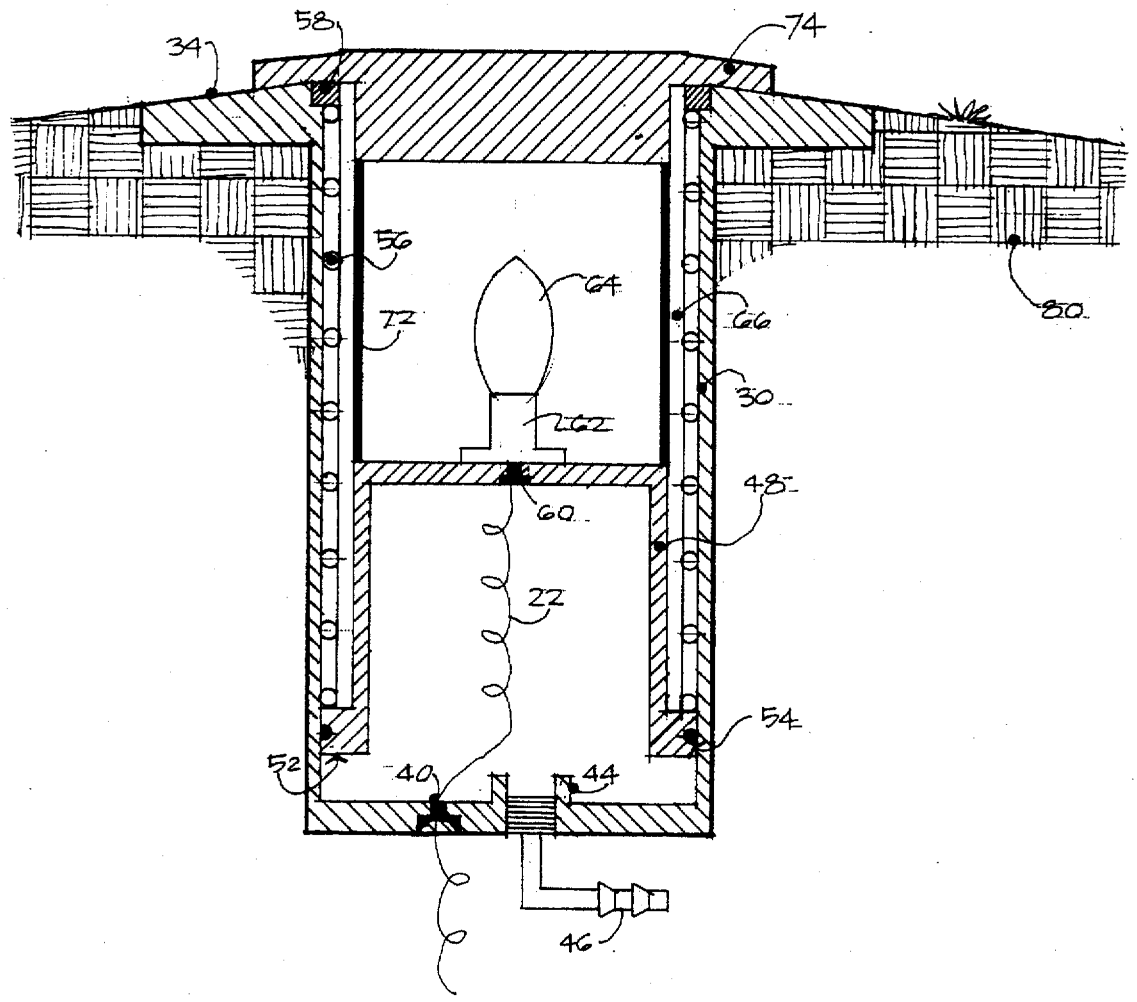
FIG. 4 is a cross-sectional view of the first embodiment of the lighting module used in the lighting assembly of the present invention in a closed and stored position.

A spring 56 is situated between the flange 52 of the second housing and the O-ring 58 of the first housing 30. The O-ring 58 will aid and assists the second housing to return to a stored position after the system is deactivated (FIG. 4). This coil is in a compressed state when the lighting module is in an extended or activated position (FIG. 3).

A clear covering 66 having an opened top 68 and an opened bottom 70 is located around the light source 64. The opened bottom 70 of the clear covering 66 is located between the outer wall of the second housing and the spring 56. This covering 66 will inherently move when the second housing is transferred.

Optionally located within the clear covering 66 is a decorative insert 72. This insert is discussed and illustrated in further detail in FIGS. 10*a* and 10*b*.

A lid 74 is received within the opened top of the clear covering. This lid 74 include a flange 76. The flange includes a lower surface 78 that contacts the top surface of the flange 34 of the first housing when the module is in a closed position (FIG. 4).

In order to utilize this device, the switch is activated to an on position. This will provide for current and air to flow into the first housing 30. As air is entering the first housing, the second housing 48 is lifted. Current is able to travel to the light source 64 via line 22. This light source will extend outwardly from the ground 80 as the air enters into the first and second housing or the interior area of the first and second housing (see FIGS. 3 and 7*a*).

In order to deactivate the system, the switch is turned to an off position. This will enable the air to escape from the first and second housing, inherently causing the second housing to be lowered. Once lowered, the spring 56 will be in an extended and unbiased position.

The second embodiment of the lighting module 28 is illustrated in FIGS. 5–8*b* and 9*b*. As seen in these figures, the first embodiment of the lighting module includes a first or exterior housing 30. The first or exterior housing 30 is buried within the ground 80. The first housing includes an enclosed bottom 32 and an opened top. The periphery of the open top includes a flange 34. When installed, the flange 34 of the exterior housing 30 is flush with the ground 80.

The bottom 32 includes a first aperture 36 and a second aperture 38. This first aperture receives the first wiring line 22. A seal 40 is located within this first aperture. This seal will provide an adequate sealing means for the first aperture. The second aperture receives the conduit (not labeled in this figure). This conduit includes an inlet connector 46. The inlet connector 46 will permit for the conduit 22 to be connected to the lighting assembly 28.

The lighting assembly further includes a second or interior housing 48. The second or interior housing 48 includes an opened bottom and an enclosed top 50. Surrounding the periphery of the opened bottom is a flange 52. When assembled, the edge of the flange 52 is in communication with the interior side wall of the exterior housing 30. This will provide for a gap to exists between the inner wall of the first housing and the outer wall of the second housing.

The opened bottom of the second housing 48 is received in the opened top of the first housing 30. This will provide for the second housing 48 to be in a slidable relationship within the first housing 30. To provide for a completely sealed system, a seal or O-ring 58 is located on the periphery of the opened first housing 30. An interior area (not labeled) will be located between the enclosed top of the second housing and the enclosed bottom of the first housing.

A third opening which includes a seal 60 extends centrally through the enclosed top 50 of the second housing. A base 62 of a light source 64 is secured to this upper surface of the enclosed top 50 of the second housing 48. The first wiring line 22 extends from the first aperture 36 through the third aperture to enable the wiring to extend though the first and second housing and be in electrical communication with the light source 64.

A collapsible air bellows 82 is situated within the interior area of the first and second housings. The air bellows 82 includes a first end 84 and a second end 86. The first end 84 of the air bellows 82 is attached to the lower surface of the enclosed top 50 of the second housing. The second end 86 of the air bellows 82 is secured to the enclosed bottom of the first housing 30. The second end 86 of the bellows 82 is attached to the upper surface of the enclosed bottom 32 to provide for the first aperture 36 and the second aperture 38 to be located under the second end of the bellow. This design and configuration will permit for the air to extend into the bellows via the second opening and for the wiring line 22 to extend through the bellows to the third aperture of the enclosed wall of the second housing.

Figure 5:
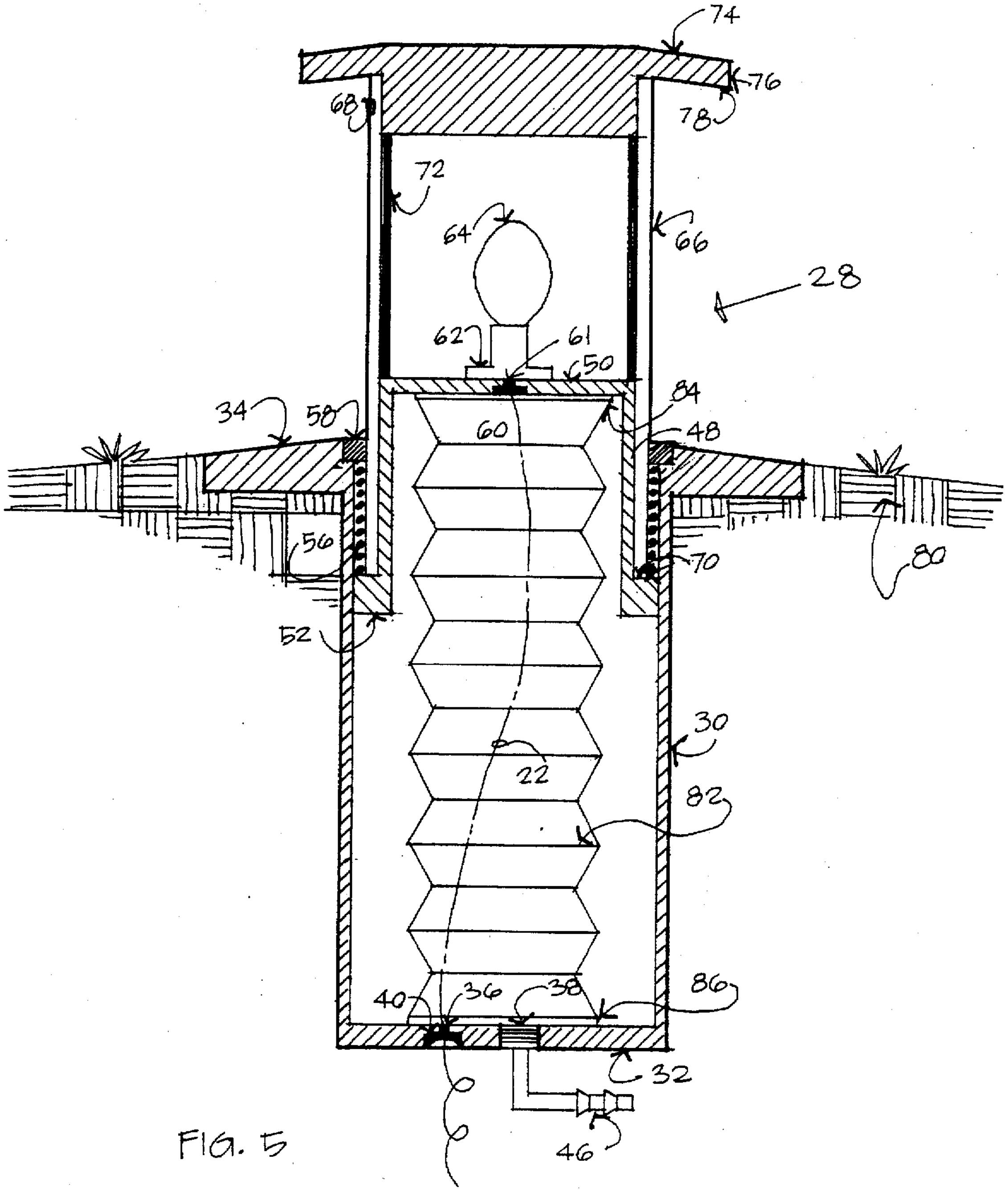
FIG. 5 is a cross-sectional view of the second embodiment of the lighting module used in the lighting assembly of the present invention in an extended and protruding position.
Figure 6:
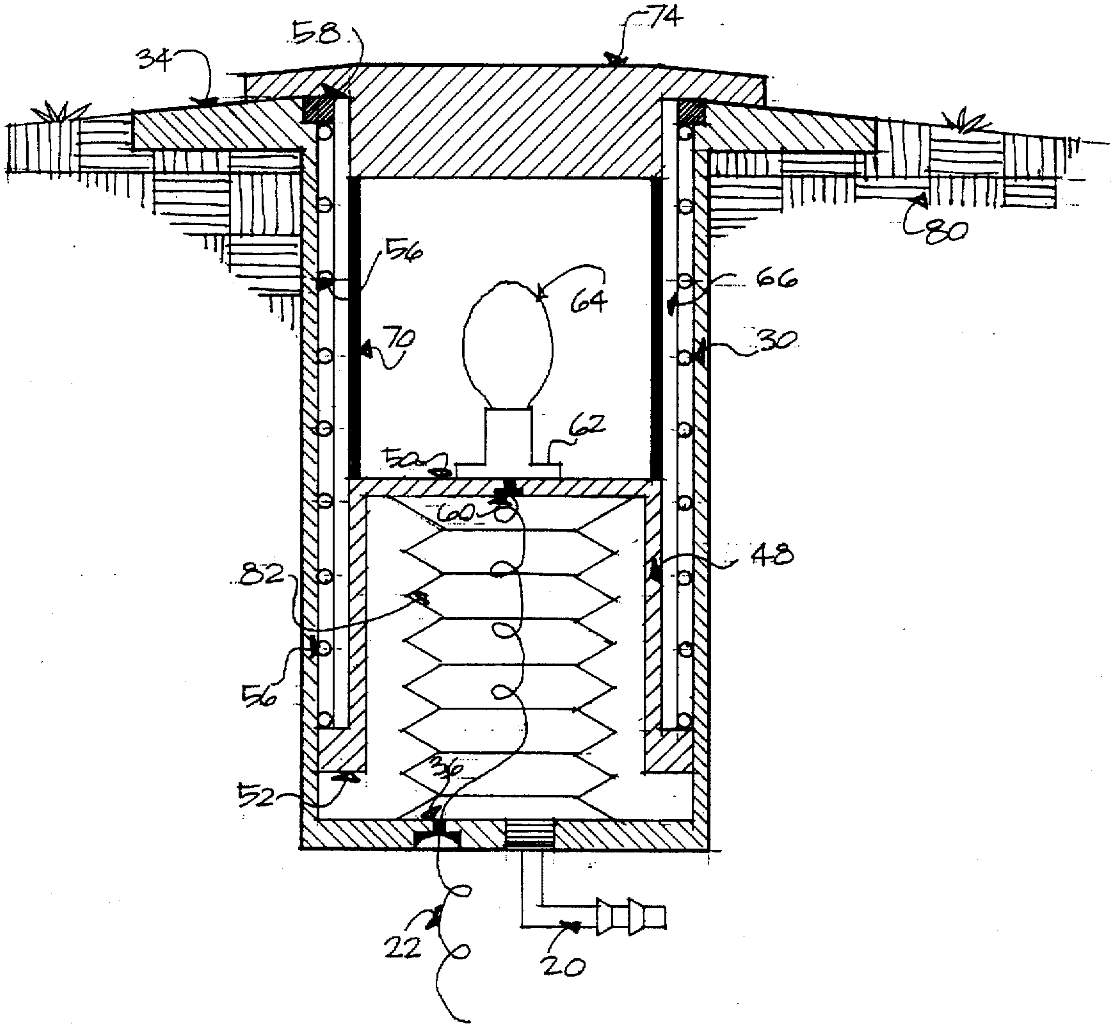
FIG. 6 is a cross-sectional view of the second embodiment of the light module used in the lighting assembly of the present invention in a closed and stored position.
Figure 7B:
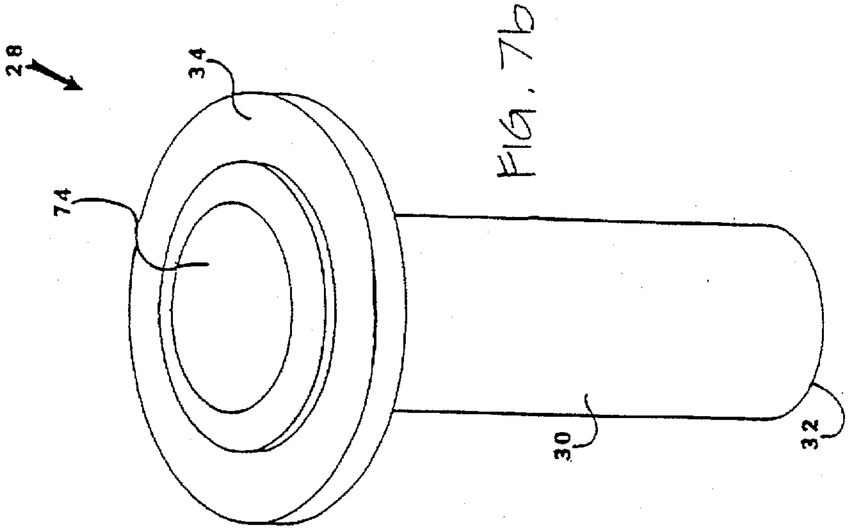
FIG. 7*b* is a perspective view of the interior or second housing stored within the exterior or first housing used in the lighting assembly of the present invention.
Figure 7A:
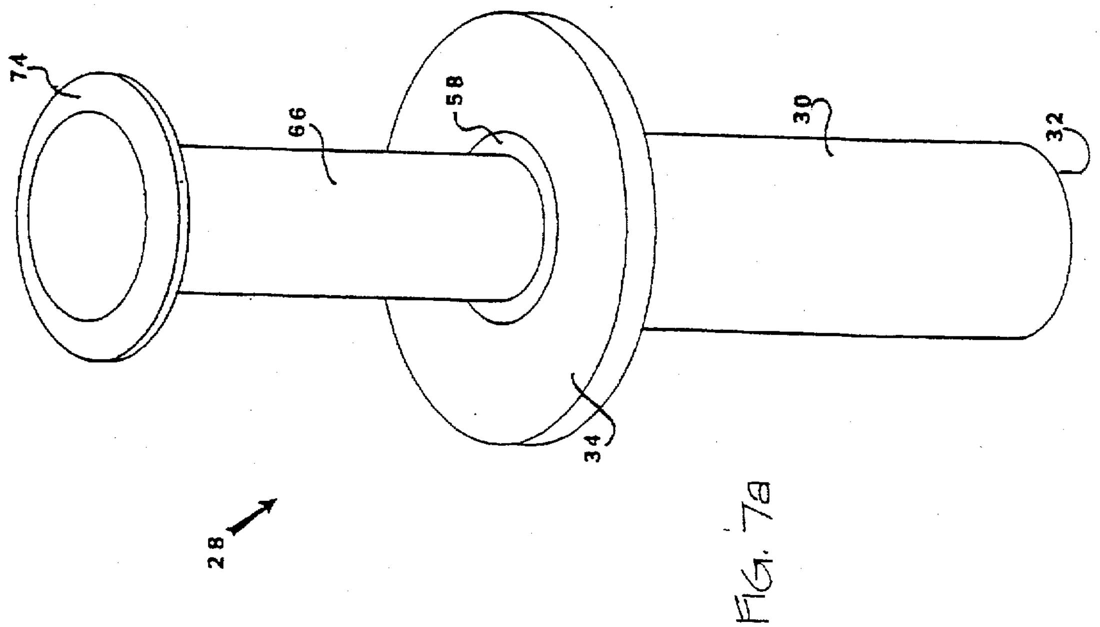
FIG. 7*a* is a perspective view of the interior or second housing extending outwardly from the exterior or first housing used in the lighting assembly of the present invention.

A spring 56 is situated between the flange 52 of the second housing and the O-ring 58 of the first housing 30. The O-ring will aid the second housing to return to a stored position after the system is deactivated (FIG. 6). This coil is in a compressed state when the lighting module is in an extended or activated position (FIG. 5).

A clear covering 66 having an opened top 68 and an opened bottom 70 is located around the light source 64. The opened bottom 70 of the clear covering 66 is located between the outer wall of the second housing and the spring 56. This covering 66 will inherently move when the second housing is transferred.

Optionally located within the clear covering 66 is a decorative insert 72. This insert is discussed and illustrated in further detail in FIGS. 10*a* and 10*b*.

A lid 74 is received within the opened top of the clear covering. This lid 74 include a flange 76. The flange includes a lower surface 78 that contacts the top surface of the flange 34 of the first housing when the module is in a closed position (FIG. 6).

In order to utilize this device, the switch is activated to an on position. This will provide for current and air to flow into the first housing 30. As air is entering the first housing, the second housing 48 is lifted by way of the bellows 82. Current is able to travel to the light source 64 via line 42. This light source will extend outwardly from the ground 80 as the air enters into the bellows and lifts the second housing (see FIGS. 4 and 7*a*).

In order to deactivate the system, the switch is turned to an off position. This will enable the air to escape from the bellows, inherently causing the second housing to be lowered. Once lowered, the spring 56 will be in an extended and unbiased position.

It is noted that in the first and second embodiment of the lighting module, the lid can be adapted to be removable secured to the opened top 68 of the clear covering 66. This will permit for the user to replace or repair the light fixture (62 and/or 64). Additionally, the removal of the lid will permit for the decorative insert to be removed, inserted or replaced.

The decorative inserts are adapted to be removably inserted into the clear covering. A few samples of the decorative insert are illustrated in FIGS. 10*a* and 10*b*. As seen in FIG. 10*a* the insert 72 includes a plurality of grooves or slits 90. This will provide for a decorative illumination of the light source. The light will escape via the grooves, while the non-grooved portion blocks the light from escaping from the insert 72.

The decorative insert 72 can also be used to control the illumination and direction of light flow. An example of this control is illustrated in FIG. 10*b*. As seen in this figure, the insert 72 includes a hole 92. This hole will provide for the light to be blocked out via the solid area 94 of the insert. This hole can be configured and designed to block out any portion of light (i.e. one-fourth, one-third, one-half, etc.).

The above described embodiments discuss a lighting assembly that is located in a ground. Though not illustrated, the lighting assembly of the present invention can be configured to be located in a ceiling. This will provide for the lighting assembly to extend downwardly from the ceiling when the device is in an activated or on position.

For added security and for prolonging the life of the wiring line, a durable weather proof material can surround the wiring line. Optionally, the wiring line can be inserted into a weather proof material, such as treated polyvinyl chloride (PVC).

Figure 8A:
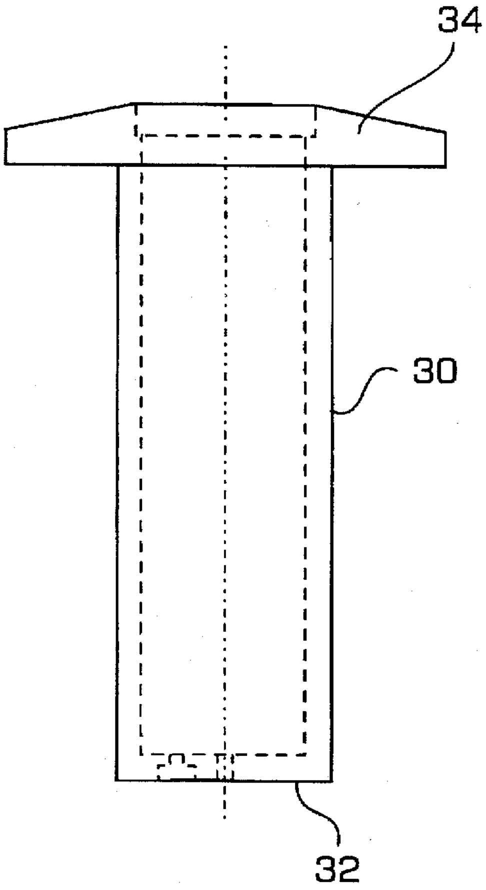
FIG. 8*a* is a perspective view of the exterior or first housing used in the lighting assembly of the present invention.
Figure 8B:
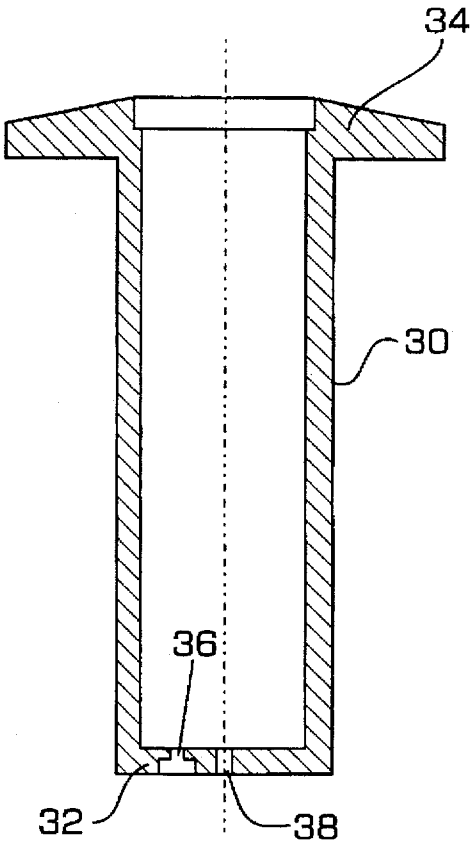
FIG. 8*b* is a cross sectional view of the exterior or first housing used in the lighting assembly of the present invention.
Figure 8C:
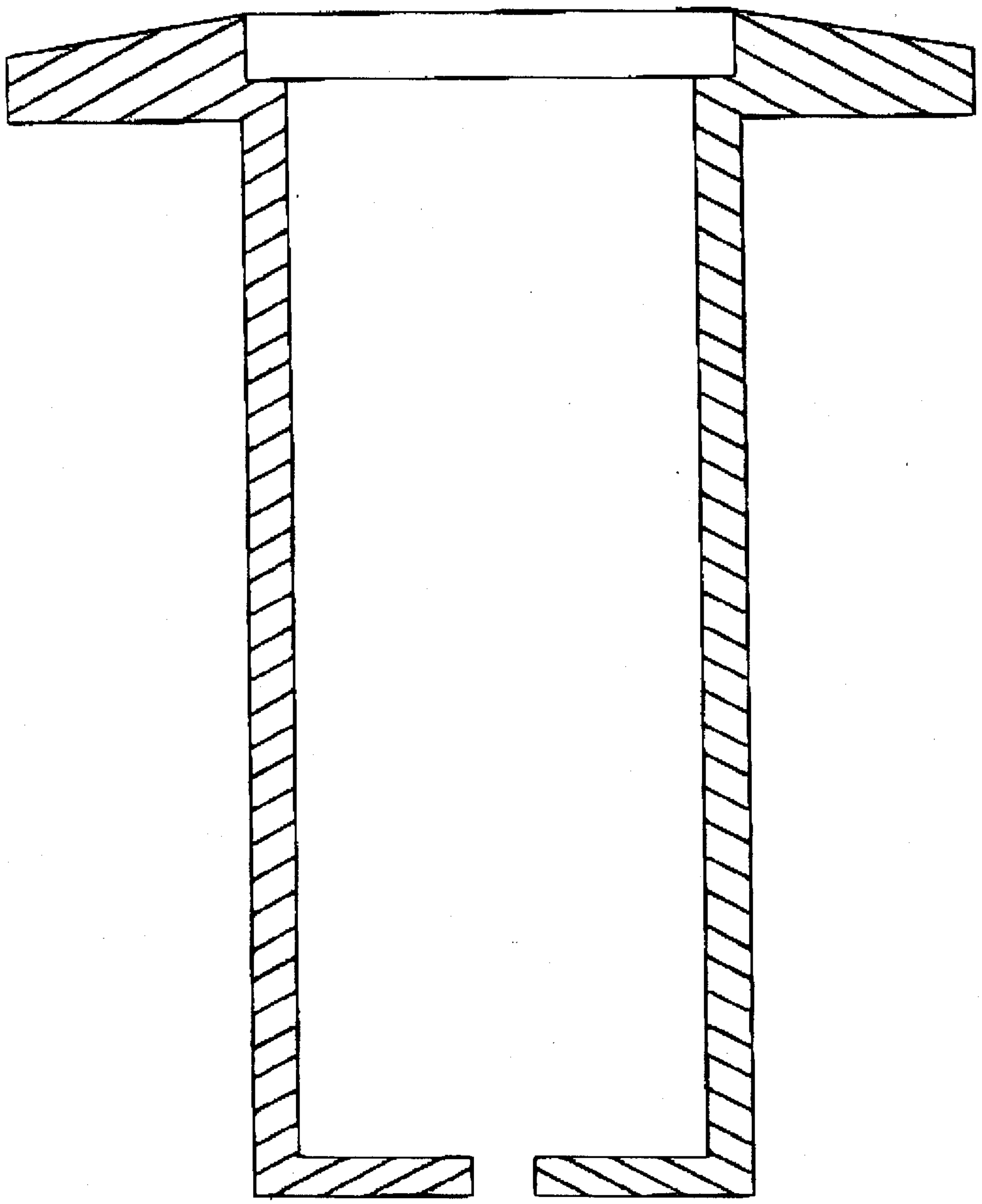
FIG. 8*c* is a cross sectional view of the exterior or first housing used in the lighting assembly of the present invention illustrating the use of a single aperture.
Figure 9B:
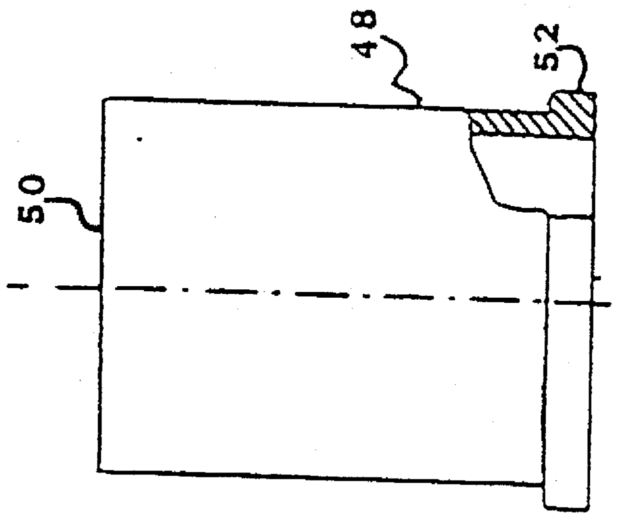
FIG. 9*b* is a partial side and partial cross-sectional view of the second or interior housing used in the second embodiment of the present invention.
Figure 9A:
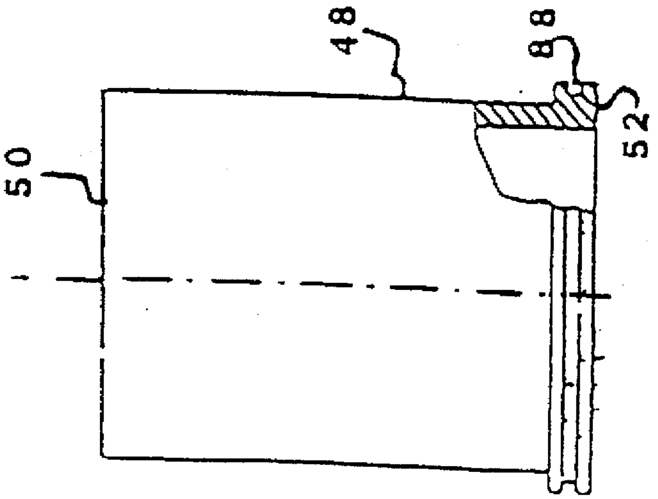
FIG. 9*a* is a partial side and partial cross-sectional view of the second or interior housing used in the first embodiment of the present invention.

To reduce manufacturing costs, the first and second apertures of the first and second embodiments can be reduce to a single aperture. This will permit for the wiring line and for the conduit to be inserted into the light assembly via the single aperture. This single aperture is illustrated in FIG. 8*c*. As seen in this figure, the first housing 30 includes a single aperture 39 for accepting the wiring line and conduit.

Though not illustrated, the lighting assembly of the present invention can be altered to include a plurality of inner housings that are in a telescoping arrangement. This will provide for a lighting assembly with an added height. For example, the first embodiment illustrated in FIG. 3, can be adjusted so that the second housing 48 is provided with an opened top and an opened bottom. The periphery of the opened top would include a flange. An inner housing having an opened bottom would be received in the opened top of the second housing. This inner housing would include a flange extending around the opened bottom and an enclosed top for receiving the light fixture. This flange would communicated with the flange of the opened top of the second housing. It is noted that a plurality of these inner housings can be included in order to provide for a desired height for the lighting assembly.

Figure 11:
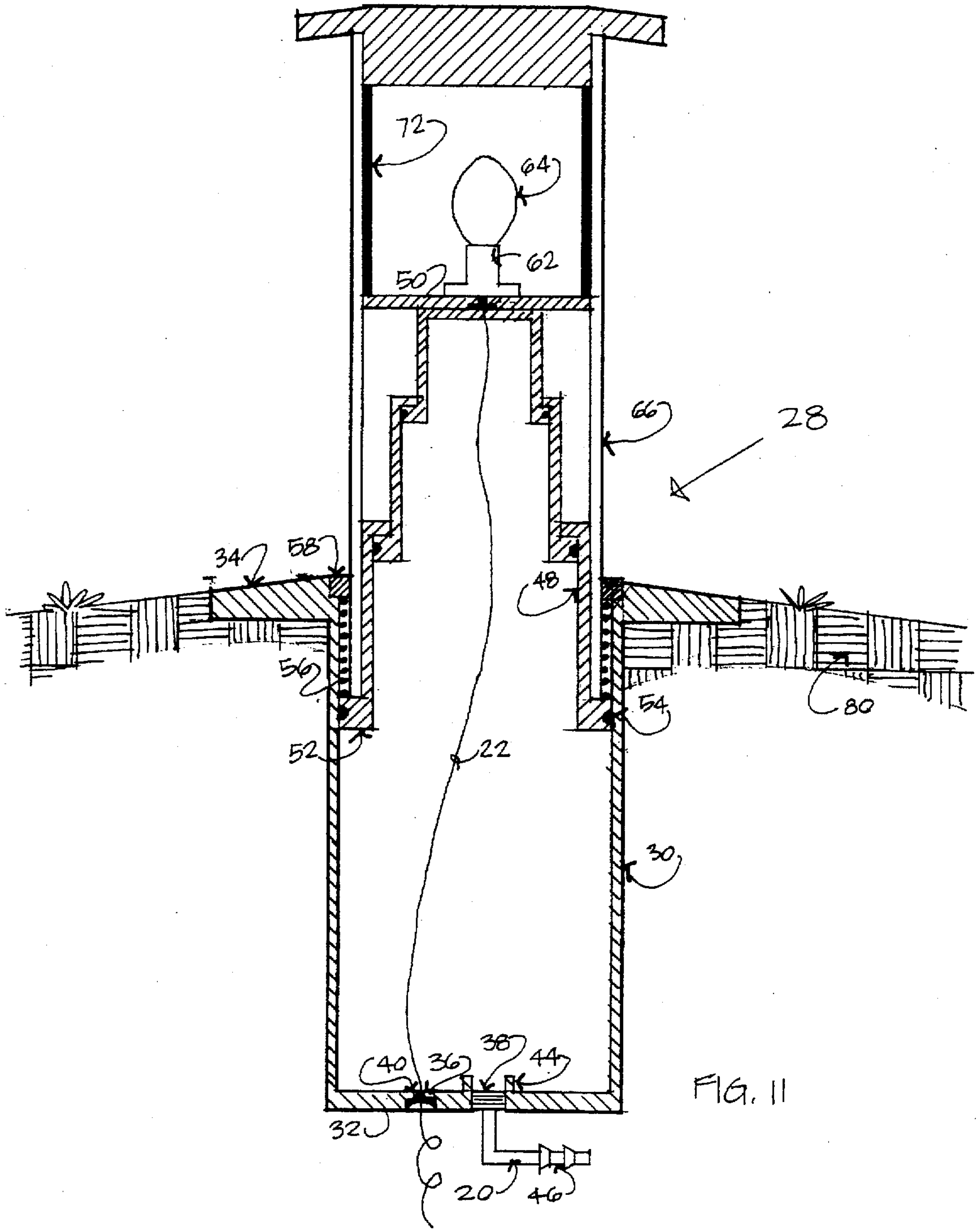
FIG. 11 is a cross-sectional view of the third embodiment of the lighting assembly of the present invention.

As seen in FIG. 11, the retractable lighting assembly 10 includes a first housing 30 and a plurality of inner housings or telescoping members 96*a*, 96*b*. These telescoping members are identical in design as the second housing 48 as illustrated in FIGS. 1–7*b*, except the telescoping members include open tops 98. The open tops include upper flanges 100 and the open bottoms include lower flanges 52. A seal or O-ring 54 can be located within the flange 52.

As seen in this figure, the upper flange 100 of the preceding telescoping member 96*a* will contact and engage the upper surface of the lower flange 52 of the succeeding telescoping member 96*b* when the device is in an open and illuminated position (as illustrated). Slidably secured to the uppermost telescoping member is the second housing 48.

In the above described embodiment, the first housing 30 and the second housing 48 are identical in shape and design as discussed and as illustrated in FIGS. 1–10*b*. Additionally, any number of telescoping members can be used in order to provide for a desired height for the housing assembly. These telescoping members are identical in shape, except that the lower or preceding member (i.e. 96*a*) is larger in size that the upper or succeeding member (i.e. 96*b*).

While the invention has been particularly shown and described with reference to an embodiment thereof, it will be understood by those skilled in the art that various changes in form and detail may be made without departing from the spirit and scope of the invention.

I claim:

1. A device that provides illumination when in use and which retracts into a base when not in use comprising:

a first housing having an enclosed bottom and an opened top;

a first flange is located on a periphery of said open top to provide for said first flange to be flushed with said ground when said first housing is buried in a base;

a second housing is disposed within said opened top of said first housing and is adapted to slide through said opened top between a first position substantially retracted into said first housing and a second position at least partially extend out of said first housing;

an illumination means is located above said second housing for providing illumination when said housing is in said second position;

an activation means for activating and extending said second housing beyond said base; and said activation means includes a pneumatic activation means to provide for air to force said second housing above said first housing and said pneumatic activation means includes an air compressor for enabling air to raise said illumination means by providing air to lift said second housing to said second position and a releasing means for enabling the air to be released for enabling said second housing to be lowered to said first position.

2. A device as in claim 1 wherein said second housing includes an enclosed top and an opened bottom;

said opened top of said first housing receives said opened bottom of said second housing and said illumination means is retained on a top surface of said enclosed top of said second housing; and a lower surface of said enclosed top of said second housing faces said enclosed bottom of said first housing.

3. A device as in claim 1 wherein a collapsible bellows is connected to said second housing and said enclosed bottom of said first housing.

4. A device as in claim 1 wherein a plurality of inner housings are located between said first housing and said second housings, and said inner housings are telescopic with each other.

5. A device as in claim 1 wherein a clear covering surrounds said illumination means.

6. A device as in claim 5 wherein said clear covering further includes a cap that is adapted to be removably secured to said clear covering for permitting access to said illumination means.

7. A device as in claim 5 wherein a decorative insert is adapted to be removably secure inside said clear covering.

8. A device as in claim 5 wherein said second housing includes a second flange which is located on a periphery of said opened bottom, an O-ring is located inside said first flange, a spring is located between said second flange and said O-ring for providing said spring to be in a coil state when said device is activated and said spring is expanded when said device is deactivated.

9. A device as in claim 8 wherein said second flange includes a groove and a second O-ring is located inside said groove.

10. A device as in claim 5 wherein said illumination means includes a light bulb affixed to a base and said light bulb is powered via activation means.

11. A device as in claim 10 wherein said activation means comprising a power supply coupled to an activation switch;

said switch is coupled to a control means;

said control means includes said air compressor; and said air compressor provides air to enter into said first housing via a conduit for providing for said air to force said second housing to slide upwardly.

12. A device as in claim 11 wherein said first housing includes a first aperture extending through said enclosed bottom for receiving a wiring line and a second aperture for receiving a conduit, said wiring line is couple to said power supply and said illumination means, said conduit is connected to said air compressor and said first housing for enabling current to activate said illumination means when activated and for enabling said second housing to extend above said first housing.

13. A device as in claim 12 wherein a first seal is located in said first aperture and a second seal is located in said second aperture.

14. A device as in claim 13 wherein a collapsible bellows is connected to said second housing and said enclosed bottom of said first housing.

15. A device as in claim 14 wherein said second housing includes a second flange which is located on a periphery of said opened bottom, an O-ring is located inside said first flange, a spring is located between said second flange and said O-ring for providing said spring to be in a coil state when said device is activated and said spring is expanded when said device is deactivated.

16. A device as in claim 11 wherein said first housing includes a single aperture extending through said enclosed bottom for receiving a wiring line and a conduit, said wiring line is couple to said power supply and said illumination means, said conduit is connected to said air compressor and said first housing for enabling current to activate said illumination means when activated and for enabling said second housing to extend above said first housing.

17. A device as in claim 16 wherein a seal is located in said single aperture for sealing said first housing.

18. A device as in claim 16 wherein said single aperture includes a ridge extending upwardly from said single aperture.

19. A device that provides illumination when in use and which retracts into a base when not in use comprising:

a first housing is buried in a base and said first housing includes a top and a bottom;

said top is opened;

a second housing is disposed within said first housing and is adapted to slide through said top between a first position substantially retraced into said first housing and a second position at least partially extended out of said first housing;

an illumination means is located on said second housing for providing illumination when said housing is in said second position;

an activation means for activating and extending said second housing beyond said base;

said activation means includes a pneumatic activation means;

said pneumatic activation means includes an air inlet means and an air releasing means; and said air inlet means enables air to enter into said first housing for raising said illumination means by providing air to lift said second housing to said second position and said releasing means provides for air to be released for enabling said second housing to be lowered to said first position.

20. A device as in claim 19 wherein said activation means comprising a power supply coupled to an activation switch;

said switch is coupled to a control means;

said control means includes an air compressor; and said air compressor constitutes said air inlet means and provides for air to enter into said first housing via a conduit for providing for said air to force said second housing to slide upwardly.

* * * * *